United States Patent Office 3,449,659
Patented June 10, 1969

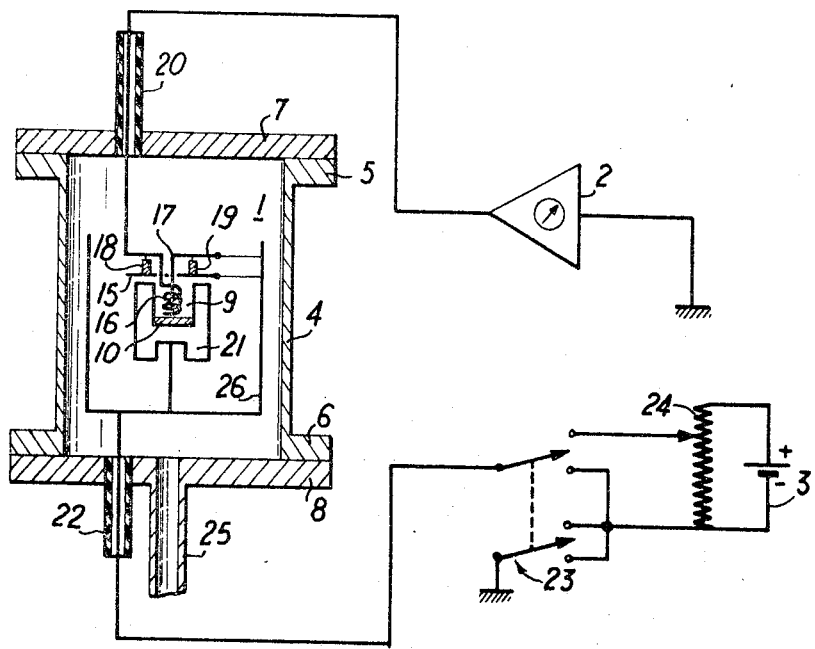
FIG.1
FIG.2
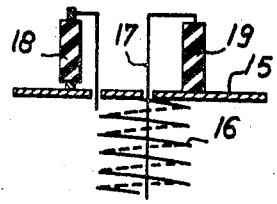

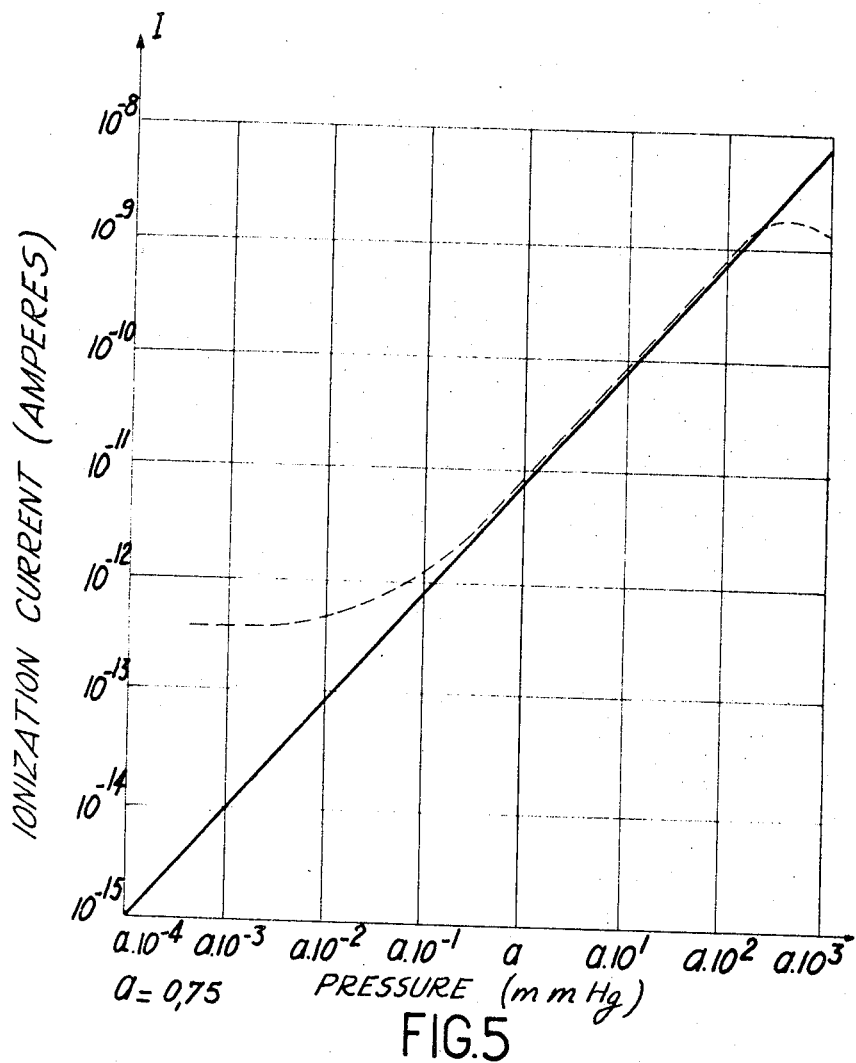

3,449,659
METHOD AND APPARATUS FOR SELECTING GAS PRESSURES OVER A WIDE RANGE
Claude Boiziau, Massy, France, assignor to Commissariat à l'Energie Atomique, Paris, France
Filed July 26, 1965, Ser. No. 474,658
Claims priority, application France, Aug. 3, 1964, 984,364
Int. Cl. G01n 27/62, 27/64
U.S. Cl. 324—33  4 Claims

ABSTRACT OF THE DISCLOSURE

A radioactive source pressure gauge and method of measuring gas pressure over a wide range. An ionization chamber comprised of a stainless steel cylinder communicating with a gas enclosure under study houses a radioactive source, which may be selectively energized with a D.C. voltage, and a helical grid spaced from said source to define a path for ionized gas. A metal probe mounted within the volume defined by said helical grid is electrically connected to said radioactive source whereby it will influence the electric field within the ionization chamber and restrict the mean free path of the ions in order to prevent recombination. An amplifier and display meter are connected to the grid to monitor the ionization current. By selectively de-energizing the source and probe the meter may be calibrated to display only ionization current.

---

The present invention is related to a method and apparatus for the measurement of pressures from atmospheric pressure to molecular vacuum, viz pressures ranging from about $0.75 \times 10^3$ mm. Hg to $0.75 \times 10^{-4}$ mm. Hg.

When measuring low pressures, a hot cathode ionization pressure-gauge is normally used covering the range of from about $0.75 \times 10^{-3}$ to $0.75 \times 10^{-10}$ mm. Hg. When measuring pressures from $0.75 \times 10^{-4}$ to $0.75 \times 10^3$ mm. Hg, it is common practice to use ionization devices of the cold ionizing source type, in which the ionizing agent is the $\alpha$-radiation of a radioactive source having a long half-life which provides substantially constant rate of emission over a long period. Such a source may be mounted inside a metal ionization chamber connected to the enclosure within which pressure is to be measured.

The $\alpha$-particles emitted by the source ionize the gas contained in the chamber. The ions thus produced are directed, under the action of an electric field produced by a potential difference of a few dozen volts, onto a collector which is, in turn, connected to a D-C amplifier adapted to measure the potential difference produced at the terminals of the input resistor by the ionization current. Since that potential difference bears a direct relationship to the number of particles ionized along the path of $\alpha$-rays (and therefore to the gas pressure within the enclosure), the measurement obtained will be indicative, after due calibration, of the value of the latter pressure.

However, such pressure-gauges have some drawbacks, as explained hereafter:

These devices are equipped with such radioactive sources as Radium 226 or derivatives thereof which generate a radioactive gas such as radon, the exhaust of which raises difficulties.

The above sources emit not only $\alpha$-rays but also $\gamma$-rays which are penetrating enough for requiring a lead shield;

For covering the $0.75.10^{-4}$–$0.75.10^3$ mm. Hg-range, it is necessary to resort to several devices such as described above, or to a single apparatus comprising several ionization chambers, e.g. one chamber covering the $0.75.10^3$–$0.75$ mm. Hg-range and another chamber covering the $0.75$–$0.75.10^{-4}$ mm. Hg-range. This requirement is due to the fact that an ionization chamber must be large enough to allow $\alpha$-rays, even in a rarefied atmosphere, to collide with a number of molecules sufficient for providing an easily measurable ion current; it is to be noted, however, that in such a large ionization chamber, the ions produced have, when pressure is high, to cover a distance longer than their mean free path and are caused to recombine: now, at atmosphere pressure, ions under a voltage of a few dozen volts will recombine as soon as they have covered more than a few millimeters;

The above described devices are adapted to measure the sum of two currents, viz, a current of fixed value due to intercepted $\alpha$-rays, and a variable ionic current which is a function of pressure; now, whereas that fixed current is negligible at higher pressures, it may become a nuisance at lower pressures, since it is then of the order of the ionic current; and In addition, such devices cannot be used in a hot atmosphere, since the ionizing source is usually protected by an organic varnish which cannot withstand a temperature of more than 250° F.

One object of the present invention is a radioactive-source pressure-gauge which, by eliminating the above-mentioned drawbacks, allows a continuous linear measurement of pressure between $0.75 \times 10^{-4}$ and $0.75 \times 10^3$ mm. Hg.

The pressure-gauge according to the present invention is characterized in that it comprises: a single measurement chamber connected with an enclosure under survey and in which the radioactive source is constituted by a plutonium deposit covered by a metal sheet which is thin enough to transmit $\alpha$-rays; a helical grid electrically insulated from the walls of said chamber and acting as an ion-collector; and a metal wire coaxial with said grid and maintained at the potential of the walls of said chamber, said wire permitting to reduce the ions mean free path in said chamber down to a few millimeters.

According to a particular form of embodiment, a switching device permits to give the radioactive source either a continuous positive potential or the grid potential.

Other features of the present invention will be disclosed hereafter, reference being had to the accompanying drawing in which FIG. 1 is a diagrammatic general view of the measuring device according to the invention;

FIG. 2 shows an enlarged view of the ion collecting elements;

Figure 4:
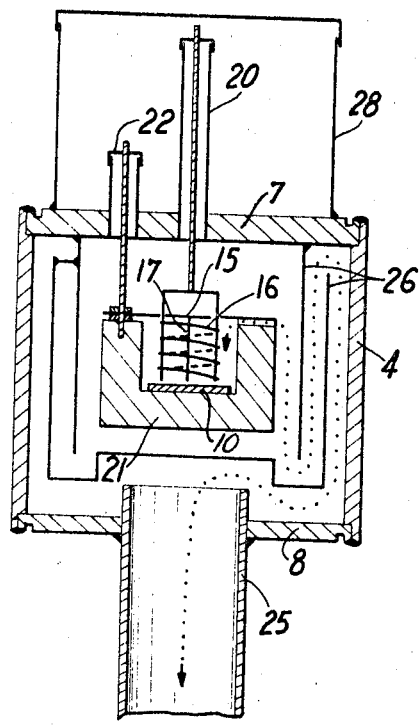

FIG. 4 is a diagrammatic view of another embodiment of the left portion of FIG. 1; and FIG. 5 shows in dotted line the saturation curve of a conventional ionization pressure-gauge, and, in full line, the curve provided by a pressure-gauge according to the invention. The abscissae designate the gas pressure in the ionization chamber (in millimeters of mercury) and the ordinates, the values of the current measured by the amplifier (in amperes).

In a pressure-gauge according to the invention, the radioactive source is constituted by a deposit of plutonium on a support, for instance of brass; this deposit is stabilized by heating to 750° F. and it is thereafter covered with a sheet of aluminium thin enough for transmitting $\alpha$-rays, for instance a 9-micron-thick sheet capable of transmitting $\alpha$-rays with an energy of 4 mev.

The enclosure within which are carried out measurements is a stainless-steel cylinder provided at both extremities with tightly fitted and highly insulated passages for connecting wires.

The measurement ionizing chamber, located inside said enclosure so as to be in staggered relation to the pumping port, is defined by the ionizing source which forms the chamber bottom, by the plug for attaching the aluminium coating which forms the chamber walls, and by an upper cover constituted by a plate (e.g. of nickel) which supports the ion-collector grid and the central so called repelling wire through the medium of insulating parts. Said cover is slightly spaced from the chamber walls by a small free space adapted to connect the ionization chamber with the enclosure while preventing too abrupt pressure changes. Said free space is small enough to provide a well defined ionizing volume and prevent foreign bodies from penetrating into the ionization chamber.

The collector-grid is mounted about the repelling wire which is maintained at the same potential with the source support, the walls and the cover of the chamber.

According to another form of embodiment of the invention, it is possible to provisionally cancel the electric field within the ionization chamber by means of a switching device mounted on the D-C feed lead, which permits to measure the current due to intercepted α-rays alone; a proper adjustment of the amplifier-zero taking the latter current into account makes it possible, once the electric field restored, to achieve measurements indicative of the ionization current alone.

The advantages offered by the present invention can be summed up as follows:

The pressure-gauge requires no lead-shield since plutonium emits α-rays but no β- or γ-rays;

The stability of the device is ensured by a constant rate of emission of the source, since the plutonium half-life is long;

Since plutonium is mass-produced by natural-uranium reactors, there is no difficulty in obtaining it and the present pressure-gauge requires but a small amount of plutonium;

The pressure-gauge according to the invention can be used in a device submitted to stoving operations carried out in vacuo at temperatures as high as 570° F., since all the parts of said pressure-gauge are of metal and the deposit of plutonium forming the radioactive source has been previously stabilized by heating to about 750° F.;

By allowing for the fixed current due to intercepted α-rays, on the one hand and by restricting the ions free-path, on the other hand, the device according to the invention permits to obtain a linear variation (viz shown by a straight line) of the ionization current v/pressure, in the $0.75.10^{-4}$—$0.75.10^3$ mm. Hg-range;

In addition, said device permits to check the zero of the amplifier under the very conditions of the measurement.

FIG. 1 shows the whole device comprising an enclosure 1 inside which are carried out measurements, a D-C amplifier 2 and a source of current 3. Said enclosure 1 comprises a stainless steel cylinder 4 having at the extremities thereof flanges 5 and 6 to which are attached closing plates 7 and 8.

Figure 3:
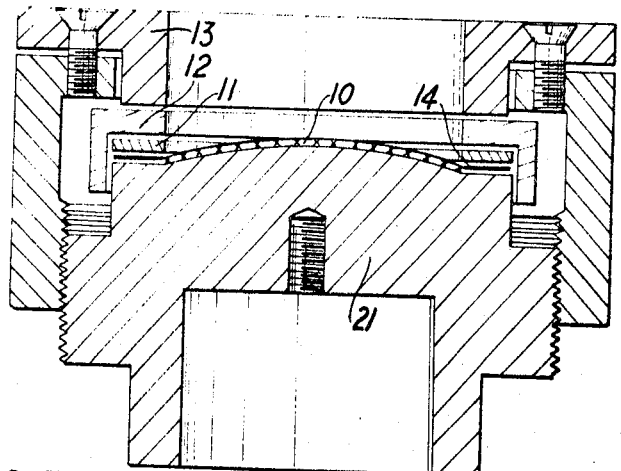
FIG. 3 represents an enlarged view of the radioactive source.

Ionization chamber 9 mounted inside said enclosure 1 (FIGS. 1 and 3) is defined by source 10, rings 11 and 12, plug 13 for fixing aluminium coating 14 and upper cover 15. Said cover 15 holds collection grid 16 and central wire 17 in position through the medium of insulating lugs 18 and 19.

Chamber 9 is connected with conduit 25 via indirect path 26. Collection grid 16 is connected with amplifier 2 via insulating passage 20. The support 21 of source 10, the repelling wire 17 and the cover 15 are connected with electric source 3, via insulating passage 22, by means of switching device 23 and resistor 24.

FIG. 2 shows, on a larger scale, a portion of the ionization chamber.

FIG. 4 shows another form of embodiment of enclosure 1, wherein the closing plates 7 and 8 are welded to cylinder 4 and the path of gas inside enclosure 1 is made longer by means of staggered cylindrical walls 26 rendered integral by means of welded spacers 27. These staggered walls are intended to damp too abrupt pressure changes and to prevent foreign bodies from penetrating into the ionization chamber.

The device according to the present invention operates as follows:

The pressure to be checked is established inside enclosure 1 via conduit 25. The α-particles emitted by source 10 ionize the gas contained in chamber 9, and the number of ionized particles is directly proportional to the gas-pressure. The ions thus produced are directed under the influence of the electric-field onto collector-grid 16. In view of the field distribution, the ions, wherever they are produced in the circular ionization chamber, have to cover but a short distance smaller than their free path at atmospheric pressure until they reach the collection-grid 16, and therefore they cannot recombine. Thus, the state of saturation at atmospheric pressure, which occurs with conventional ionization pressure-gauges (as shown in FIG. 5, upper portion of the dotted curve) no longer occurs with the pressure-gauge according to the invention and the upper portion of the curve is straight (see FIG. 5, curve in full line).

Collector-grid 16 also intercepts a certain amount of α-particles which is a nuisance.

In order to achieve measurements indicative of the ionization current alone, it is simply needed to provisionally cancel the electric field within the ionization chamber by means of switch 23, to measure the current due to intercepted α-rays alone, then to adjust the zero of amplifier 2 taking the latter current into account, and finally to restore the electric field.

By so doing, one achieves a linear variation of the current measured even at lower pressures (see FIG. 5, lower portion of curve in full line), and it follows that the current measured by the amplifier is proportional to the pressure inside the ionization chamber whatever be the value of said pressure in the $0.75 \times 10^{-4}$—$0.75 \times 10^3$ mm. Hg-range.

What is claimed is:
1. An instrument for measuring gas pressure within an enclosure ranging between atmospheric pressure and molecular vacuum, comprising,
   a single ionization chamber communicating with the enclosure under study;
   a plutonium deposit mounted at one end of said chamber;
   a helical collection grid mounted at another end of said chamber, spaced from said deposit;
   a metal probe fixed within the volume defined by said helical grid;
   a switch selectively connecting said plutonium deposit and said probe to a D.C. source; and
   means connected to said grid for amplifying and displaying the current on said grid.

2. A radioactive source pressure gauge for measuring pressure within an enclosure ranging between atmospheric pressure and molecular vacuum comprising,
   a single closed cylindrical ionization chamber communicating with the enclosure under study;
   a plutonium deposit fixed at one end of said chamber and electrically insulated therefrom;
   a helical collection grid mounted at another end of said chamber, spaced from said plutonium deposit and electrically insulated from said chamber;
   a metal probe fixed within the volume defined by said helical grid;
   a switch selectively connecting said plutonium deposit and said probe to a D.C. source, and
   means connected to said grid for amplifying and displaying the output of said gauge.

3. An instrument for measuring gas pressure within an enclosure ranging between atmospheric pressure and molecular vacuum comprising, a single ionization chamber communicating with the enclosure under study;

radioactive source means mounted within said chamber for ionizing gas therein;

grid means mounted within said chamber for collecting said gas ions;

probe means mounted within said chamber for restricting the mean free path said ions traverse between said source means and said grid means;

means for selectively energizing said source means and said probe means with D.C. voltage; and output display means connected to said grid means.

4. A method of measuring gas pressure within an enclosure ranging between atmospheric pressure and molecular vacuum including the steps of:

ionizing the gas within a chamber communicating with said enclosure by exposing said gas to a source of radioactivity;

establishing a dynamic electric field between said source and a grid to collect said ions upon said grid;

restricting the mean free path of said ions between said source and said grid in order to reduce recombination of said ions; and selectively discontinuing said dynamic electric field in order to measure only the dynamic ionization current at said grid.

References Cited

UNITED STATES PATENTS

| 2,739,283 | 3/1956 | Roehrig | 324—33 |
| 2,968,730 | 1/1961 | Morris et al. | 324—33 |
| 3,044,012 | 7/1962 | Zito et al. | 324—33 |
| 3,126,512 | 3/1964 | Zito | 324—33 |

RUDOLPH V. ROLINEC, *Primary Examiner.*

C. F. ROBERTS, *Assistant Examiner.*

U.S. Cl. X.R.

250—43.5